United States Patent
Rajadurai et al.

(10) Patent No.: US 12,342,160 B2
(45) Date of Patent: Jun. 24, 2025

(54) APPARATUS AND METHOD FOR VERIFYING AUTHENTICITY OF A BACKHAUL-RADIO LINK FAILURE

(71) Applicant: Samsung Electronics Co., Ltd., Gyeonggi-do (KR)

(72) Inventors: Rajavelsamy Rajadurai, Bangalore (IN); Rohini Rajendran, Bangalore (IN); Nivedya Parambath Sasi, Bangalore (IN)

(73) Assignee: Samsung Electronics Co., Ltd (KR)

( * ) Notice: Subject to any disclaimer, the term of this patent is extended or adjusted under 35 U.S.C. 154(b) by 424 days.

(21) Appl. No.: 17/881,840

(22) Filed: Aug. 5, 2022

(65) Prior Publication Data

US 2023/0048891 A1 Feb. 16, 2023

(30) Foreign Application Priority Data

Aug. 6, 2021 (IN) .............................. 202141035690
Jul. 29, 2022 (IN) .............................. 202141035690

(51) Int. Cl.
 *H04W 12/06* (2021.01)
 *H04L 1/1607* (2023.01)
 *H04W 12/122* (2021.01)
 *H04W 24/08* (2009.01)
 *H04W 76/19* (2018.01)

(52) U.S. Cl.
 CPC ........... *H04W 12/06* (2013.01); *H04L 1/1607* (2013.01); *H04W 12/122* (2021.01); *H04W 24/08* (2013.01); *H04W 76/19* (2018.02)

(58) Field of Classification Search
 CPC ... H04W 12/06; H04W 12/122; H04W 24/08; H04W 76/19; H04L 1/1607
 See application file for complete search history.

(56) References Cited

U.S. PATENT DOCUMENTS

2003/0108052 A1* 6/2003 Inoue .................. H04L 61/2517
                                                              370/399
2019/0394823 A1 12/2019 Jo et al.
(Continued)

OTHER PUBLICATIONS

Lenovo, Motorola Mobility, "Conditional Handover in IAB", R2-2105816, 3GPP TSG-RAN WG2 Meeting #114, May 19-27, 2021, 3 pages.
(Continued)

*Primary Examiner* — James P Duffy
(74) *Attorney, Agent, or Firm* — The Farrell Law Firm, P.C.

(57) ABSTRACT

The disclosure relates to a 5G or 6G communication system for supporting a higher data transmission rate. Embodiments herein provide an apparatus and method for verifying authenticity of a BH-RLF. A method is provided for using a new message to verify the authenticity of the BH-RLF. A method is provided for using existing and/or message over an F1AP and an RRC to verify the authenticity of the BH-RLF. A method is provided for using a hash based procedure for protection of the BH-RLF indication. A method is provided for generating a unique secret key at an parent IAB node and a child IAB node to protect the BAP control messages. Further, a method is provided for re-using ICMP ping messages to check the destination availability based on a received BH-RLF indication.

15 Claims, 17 Drawing Sheets

(56) References Cited

U.S. PATENT DOCUMENTS

2020/0045765 A1* 2/2020 Veeramallu ............. H04W 4/70
2021/0195675 A1   6/2021 Park et al.
2022/0045900 A1* 2/2022 Oda ................... H04L 43/0811
2022/0151006 A1* 5/2022 Muhammad ............ H04L 45/22

OTHER PUBLICATIONS

Kyocera, "Details of Topology Adaptation Enhancements for eIAB", R2-2105510, 3GPP TSG-RAN WG2 #114-e, May 19-27, 2021, 7 pages.
Nokia, Nokia Shanghai Bell, "Re-routing Enhancements and RLF Indications in IAB", R2-2107516, 3GPP TSG-RAN WG2 Meeting #115, Aug. 9-27, 2021, 8 pages.
International Search Report dated Nov. 17, 2022 Issued in counterpart application No. PCT/KR2022/011678, 8 pages.
3GPP, 3rd Generation Partnership Project; Technical Specification Group Radio Access Network; NG-RAN; F1 Application Protocol (F1AP), (Release 16), 3GPP TS 38.473 V16.6.0, Jul. 2021, 463 pages.

* cited by examiner

APPARATUS AND METHOD FOR VERIFYING AUTHENTICITY OF A BACKHAUL-RADIO LINK FAILURE

CROSS-REFERENCE TO RELATED APPLICATION(S)

This application is based on and claims priority under 35 U.S.C. § 119(a) to Indian Provisional Patent Application No. 202141035690, which was filed in the Indian Patent Office on Aug. 6, 2021, and Indian Complete Patent Application No. 202141035690, which was filed in the Indian Patent Office on Jul. 29, 2022, the entire disclosure of each of which is incorporated herein by reference in its entirety.

BACKGROUND

1. Field

The disclosure relates generally to wireless communication, and more specifically, to an apparatus and method for verifying authenticity of a backhaul-radio link failure.

2. Description of Related Art

5$^{th}$ generation (5G) mobile communication technologies provide broad frequency bands such that high transmission rates and new services are possible, and can be implemented in "sub 6 GHz" bands such as 3.5 GHz, and in "above 6 GHz" bands, referred to as mmWave, including 28 GHz and 39 GHz. In addition, it has been considered to implement 6$^{th}$ generation (6G) mobile communication technologies (referred to as beyond 5G systems) in terahertz (THz) bands (e.g., 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced mobile broadband (eMBB), ultra reliable low latency communications (URLLC), and massive machine-type communications (mMTC), there has been ongoing standardization regarding beamforming and massive multiple input multiple output (MIMO) for mitigating radio-wave path loss and increasing radio-wave transmission distances in mmWave, supporting numerologies (e.g., operating multiple subcarrier spacings) for efficiently utilizing mmWave resources and dynamic operation of slot formats, initial access technologies for supporting multi-beam transmission and broadbands, definition and operation of bandwidth part (BWP), new channel coding methods such as a low density parity check (LDPC) code for large amount of data transmission and a polar code for highly reliable transmission of control information, layer 2 (L2) pre-processing, and network slicing for providing a dedicated network specialized to a specific service.

Currently, there are ongoing discussions regarding improvement and performance enhancement of initial 5G mobile communication technologies in view of services to be supported by additional 5G mobile communication technologies, and there has been physical layer standardization regarding technologies such as vehicle-to-everything (V2X) for aiding driving determination by autonomous vehicles based on information regarding positions and states of vehicles transmitted by the vehicles and for enhancing user convenience, new radio unlicensed (NR-U) aimed at system operations conforming to various regulation-related requirements in unlicensed bands, NR user equipment (UE) power saving, non-terrestrial network (NTN), which is UE-satellite direct communication for providing coverage in an area in which communication with terrestrial networks is unavailable, and positioning.

Moreover, there has been ongoing standardization in air interface architecture/protocol regarding technologies such as industrial Internet of things (IIoT) for supporting new services through interworking and convergence with other industries, integrated access and backhaul (IAB) for providing a node for network service area expansion by supporting a wireless backhaul link and an access link in an integrated manner, mobility enhancement including conditional handover and dual active protocol stack (DAPS) handover, and two-step random access for simplifying random access procedures (2-step RACH for NR). There also has been ongoing standardization in system architecture/service regarding a 5G baseline architecture (e.g., service based architecture or service based interface) for combining network functions virtualization (NFV) and software-defined networking (SDN) technologies, and mobile edge computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with extended reality (XR) for efficiently supporting augmented reality (AR), virtual reality (VR), mixed reality (MR), etc., 5G performance improvement and complexity reduction by utilizing artificial intelligence (AI) and machine learning (ML), AI service support, metaverse service support, and drone communication.

Further, such development of 5G mobile communication systems will serve as a basis for developing not only new waveforms for providing coverage in terahertz bands of 6G mobile communication technologies, multi-antenna transmission technologies such as full dimensional MIMO (FD-MIMO), array antennas and large-scale antennas, metamaterial-based lenses and antennas for improving coverage of terahertz band signals, high-dimensional space multiplexing technology using orbital angular momentum (OAM), and reconfigurable intelligent surface, but also full-duplex technology for increasing frequency efficiency of 6G mobile communication technologies and improving system networks, AI-based communication technology for implementing system optimization by utilizing satellites and AI from the design stage and internalizing end-to-end AI support functions, and next-generation distributed computing technology for implementing services at levels of complexity exceeding the limit of UE operation capability by utilizing ultra-high-performance communication and computing resources.

IAB is an important addition in 5G NR that allows rapid and cost-effective mmWave deployment through self-backhauling in a same spectrum. 5G NR supports IAB by using an IAB-donor that wirelessly connects to a gNB and is capable of serving one or more IAB-nodes.

The IAB-donor consists of an IAB-donor-control unit (CU) and one or more IAB-donor-data units (DU(s)). In case of separation of a gNB-CU-control plane (CP) and gNB-CU-user plane (UP), the IAB-donor may consist of an IAB-donor-CU-CP, multiple IAB-donor-CU-UPs, and multiple IAB-donor-DUs.

The F1-U traffic between an IAB-node and IAB-donor-CU is backhauled via the IAB-donor-DU and an optional intermediate hop IAB-node(s).

A backhaul adaptation protocol (BAP) is a layer 2 Routing protocol used in 5G for IAB. The BAP is used to deliver packets to a destination node over multiple hops. The BAP is located on top of the 3rd generation partnership project (3GPP) radio link control (RLC) layer. A BAP packet data unit (PDU) may be a data PDU or a control PDU. The data PDUs are used to transport upper layer data along a path towards a destination. The control PDUs are used to indicate backhaul radio link failures (BH-RLFs), to poll for flow control information, and to provide flow control feedback.

Currently, there is no protection over BAP control PDU for any indication; specifically, for BH-RLF indication. If the control message (i.e., the BH-RLF indication from the IAB parent node to the IAB child node) is not protected, then an over-the-air (OTA) attacker could potentially trigger BH-RLF recovery on the IAB child node, by sending a fake BAP control PDU with the BH-RLF indication. Generally, the IAB child node, without any verification, would try to establish a recovery path, which may result in abrupt loss of connection for large number of UEs, short or long-term degradation in throughput or speed, and/or loss of an operator's reputation, among other things.

Hence, a need exists for a mechanism to protect the IAB nodes falling into such attacks by verifying the BH-RLF indication, to prevent quality of experience (QoE) degradation and/or out-of-service (OOS).

SUMMARY

The disclosure is provided to address at least the above-mentioned problems and/or disadvantages and to provide at least the advantages described below.

Accordingly, an aspect of the disclosure is to provide an apparatus and method for verifying the authenticity of a BAP.

Another aspect of the disclosure is to provide an apparatus and method for verifying the authenticity of a BAP control PDU when indicating BH-RLF.

Another aspect of the disclosure is to provide an apparatus and method for validating a received BH-RLF indication in a BAP Control PDU by an IAB child node.

Another aspect of the disclosure is to provide an apparatus and method for protecting the BH-RLF indication from tampering by protecting the BH-RLF indication using a unique, secret key known to IAB-Donor, IAB-parent node, and IAB-child node.

Another aspect of the disclosure is to provide an apparatus and method for protecting a BH-RLF indication from tampering by utilizing a hashing and verification procedure.

In accordance with an aspect of the disclosure, a method is provided for verifying a BH-RLF in a wireless network. The method includes receiving, by a child IAB node in the wireless network, a BH-RLF message indicating that the BH-RLF between the child IAB node and a parent IAB node in the wireless network; sending, by the child IAB node, at least one message to the parent IAB node; determining, by the child IAB node, whether an acknowledgment is received in response to the at least one message; confirming, by the child IAB node, the BH-RLF, in response to determining that the acknowledgment is not received; and detecting, by the child IAB node, that the BH-RLF message is a fake backhaul link failure message, in response to determining that the acknowledgment is received.

In accordance with another aspect of the disclosure, a device is provided for verifying a BH-RLF in a wireless network. The device includes a memory; and a processor configured to receive a BH-RLF message indicating the BH-RLF between the child IAB node and a parent IAB node in the wireless network, send at least one message to the parent IAB node, determine whether an acknowledgment is received in response to the at least one message, confirm the BH-RLF, in response to the determination that the acknowledgment is not received, and detect that the BH-RLF message is a fake backhaul link failure message, in response to the determination that the acknowledgment is received.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
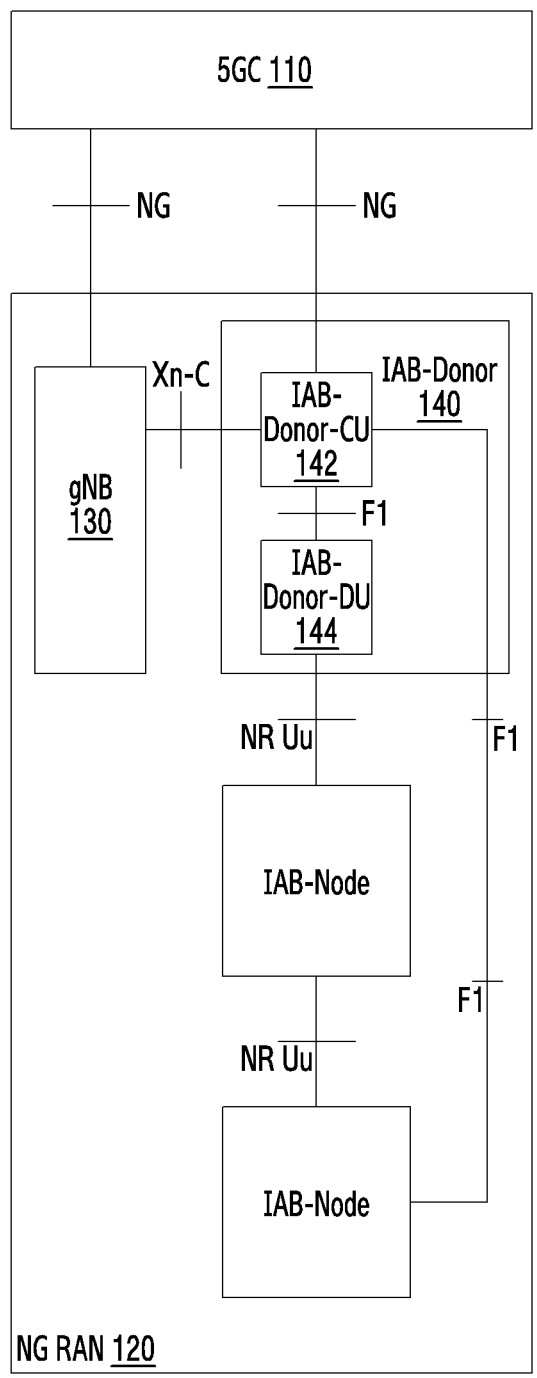
FIG. 1 illustrates an architecture of an IAB.

The following description, with reference to the accompanying drawings, is provided to assist in a comprehensive understanding of various embodiments of the disclosure as defined by the claims and their equivalents.

The embodiments described herein and the various features and advantageous details thereof are explained more fully with reference to the non-limiting embodiments that are illustrated in the accompanying drawings and detailed in the following description.

Descriptions of well-known components and processing techniques are omitted to avoid obscuring the embodiments herein. Also, the various embodiments described herein are not necessarily mutually exclusive, as some embodiments can be combined with one or more other embodiments to form new embodiments.

Similar reference characters may denote corresponding features consistently throughout the figures.

The term "or" as used herein, refers to a non-exclusive or, unless otherwise indicated.

The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is customary to a person of ordinary skill in the art, embodiments may be described and illustrated in terms of blocks which carry out a described function or functions. These blocks, which may be referred to herein as managers, units, modules, hardware components, etc., may be physically implemented by analog and/or digital circuits such as logic gates, integrated circuits, microprocessors, microcontrollers, memory circuits, passive electronic components, active electronic components, optical components, hard-wired circuits, etc., and may optionally be driven by firmware and software. The circuits may be embodied in one or more semiconductor chips, or on substrate supports such as printed circuit boards, etc. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block may be physically separated into two or more interacting and discrete blocks without departing from the scope of the disclosure. Likewise, the blocks of the embodiments may be physically combined into more complex blocks without departing from the scope of the disclosure.

In accordance with an embodiment, a method is provided for verifying a BH-RLF in a wireless network, where the method comprises receiving, by a child IAB node in the wireless network, a BH-RLF message, wherein the backhaul radio link failure message indicates the BH-RLF between the child IAB node and a parent IAB node in the wireless network; sending, by the child IAB node, at least one message to the parent IAB node; determining, by the child IAB node, whether an acknowledgment is received in response to the at least one message sent; and performing, by the child IAB node, one of: confirming the BH-RLF in response to the determination that the acknowledgment is not received; and detecting that the BH-RLF message is a fake BH-RLF message in response to the determination that the acknowledgment is received.

FIG. 1 illustrates an architecture of an IAB.

Referring to the FIG. 1, the IAB includes a 5G core (5GC) 110 and a next generation (NG) radio access network (RAN) 120. The NG RAN 120 supports IAB by the IAB-node wirelessly connecting to a gNB 130 capable of serving IAB-nodes, named an IAB-donor 140. The IAB-donor 140 includes an IAB-donor-CU 142 and one or more IAB-donor-DU(s) 144. In case of separation of a gNB-CU-CP and gNB-CU-UP, the IAB-donor 140 may include an IAB-donor-CU-CP, multiple IAB-donor-CU-UPs, and multiple IAB-donor-DUs.

The IAB-node connects to an upstream IAB-node or an IAB-donor-DU via a subset of the UE functionalities of the NR Uu interface (e.g., an IAB-MT (Mobile Terminal) function of the IAB-node). The IAB-node provides wireless backhaul to the downstream IAB-nodes and UEs via the network functionalities of the NR Uu interface (e.g., an IAB-DU function of the IAB-node). The F1-C traffic between an IAB-node and IAB-donor-CU 142 is backhauled via the IAB-donor-DU 144 and the optional intermediate hop IAB-node(s). The F1-U traffic between an IAB-node and IAB-donor-CU is backhauled via the IAB-donor-DU and the optional intermediate hop IAB-node(s).

All functions specified for a gNB-DU are equally applicable for an IAB-DU and IAB-donor-DU, unless otherwise stated, and all functions specified for a gNB-CU are equally applicable for an IAB-donor-CU, unless otherwise stated. All functions specified for a UE context are equally applicable for managing the context of IAB-MT, unless otherwise stated.

Figure 2:
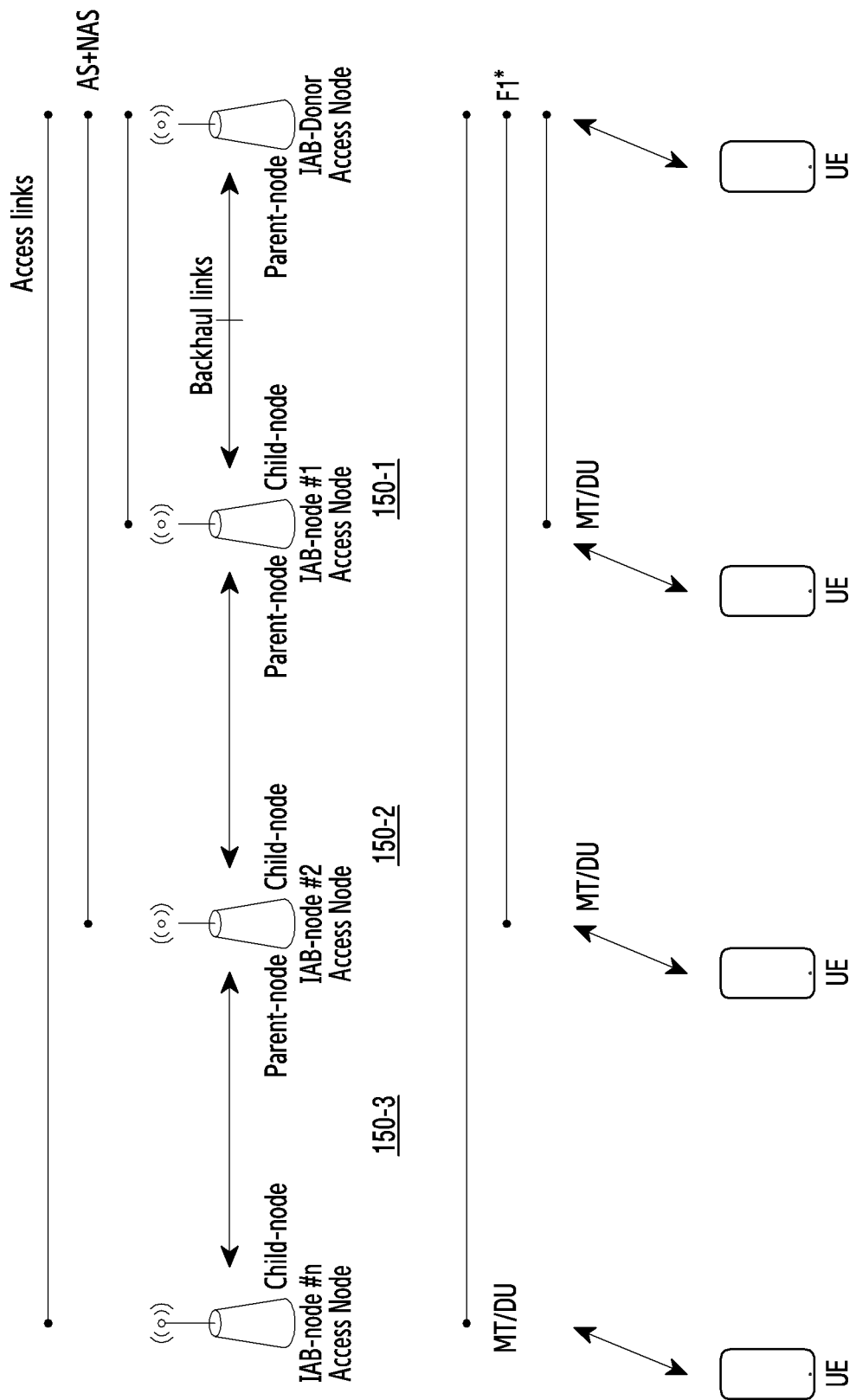
FIG. 2 illustrates an IAB security architecture.

FIG. 2 illustrates an IAB security architecture.

Referring to the FIG. 2, there are security aspects as authentication, access stratum (AS) and non-access stratum (NAS) security of a UE, security of a backhaul-link between a child-node and a parent-node, authentication, AS, and NAS security of an MT part of IAB-node, security of F1*-C between MT/DU part of IAB-node and IAB-donor, and security of F1*-U between MT/DU part of IAB-node and IAB-donor.

For example, the BH-RLF can occur between the IAB-donor 140 and the IAB-node #1 150-1, or IAB-node #1 150-1 receives BH-RLF from any other IAB node or a transmitter. This causes backhaul connectivity loss for the parent-node IAB-node #1 150-1. This also causes upstream backhaul connectivity loss for child-nodes IAB-node #2 150-2 and IAB-node #n 150-3. For the sake of example, the parent IAB-node #1 150-1 cannot recover the backhaul-link via the IAB-node #n 150-3 whatsoever reasons, for example, due to weak radio strengths.

Therefore, the parent IAB-node #1 150-1 informs the child IAB-node #2 150-2 about the upstream backhaul connectivity loss so that the child IAB-node #2 150-2 can itself seek means to recover. The child IAB-node #2 150-2 identifies that the Path1 is lost. Therefore, it recovers using Path2 via the IAB-node #n 150-3.

Figure 3:
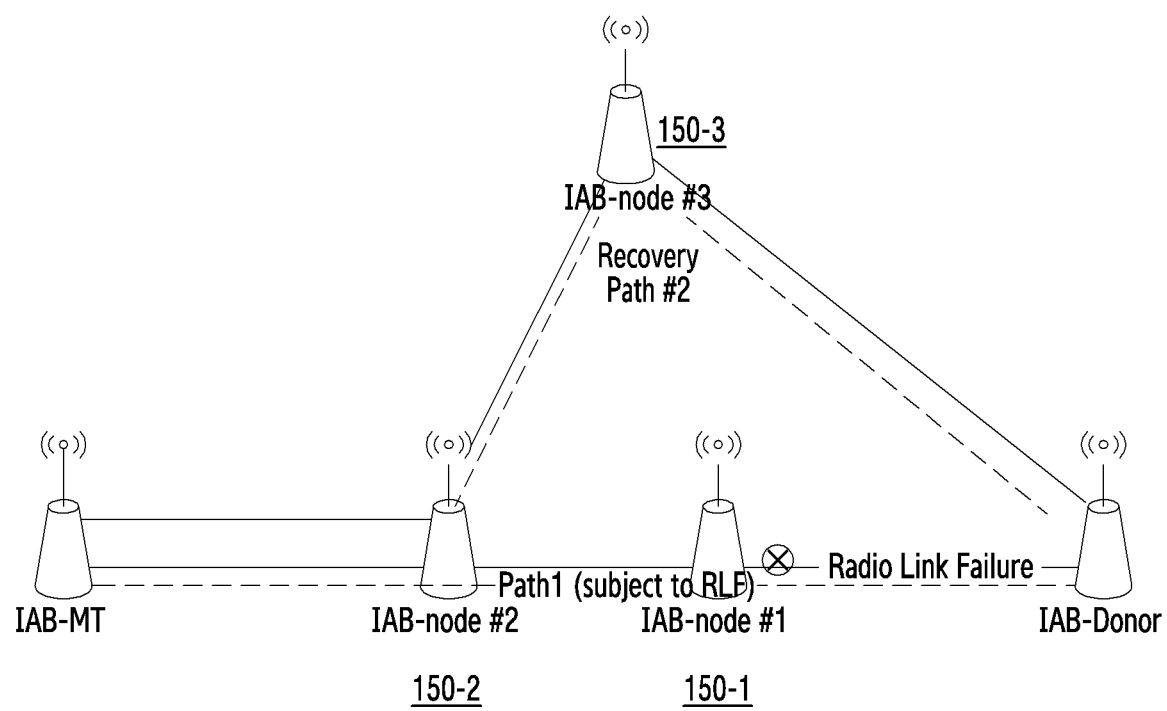
FIG. 3 illustrates a BH-RLF recovery.

FIG. 3 illustrates a BH-RLF recovery.

Referring to the FIG. 3, if a control message, i.e., a BH-RLF indication, from the IAB parent-node 150-1 to the IAB child-node 150-2 is not protected, an OTA attacker could potentially trigger BH-RLF recovery on the IAB child-node 150-2 by sending the BH-RLF indication to one or more child nodes.

The IAB-node #2 150-2, without any verification, would try to establish path 2. In this case, the attacker is making the IAB-node #2 150-2 to switch to the IAB node #3 150-3 (from path #1 to path #2) unnecessarily, which may result in abrupt loss of connection for large number of UEs, short- or long-term degradation in throughput or speed, and loss of an operator's reputation, among other things. Additionally, as a result IAB-node #2 150-2 will re-establish an RRC connection with the IAB-node #3 150-3, causing overhead and wastage of resources. Hence, there should be a mechanism to protect the IAB-node #2 150-2 falling into such attacks by verifying the validity/authenticity of the BH-RLF indication.

Figure 4:
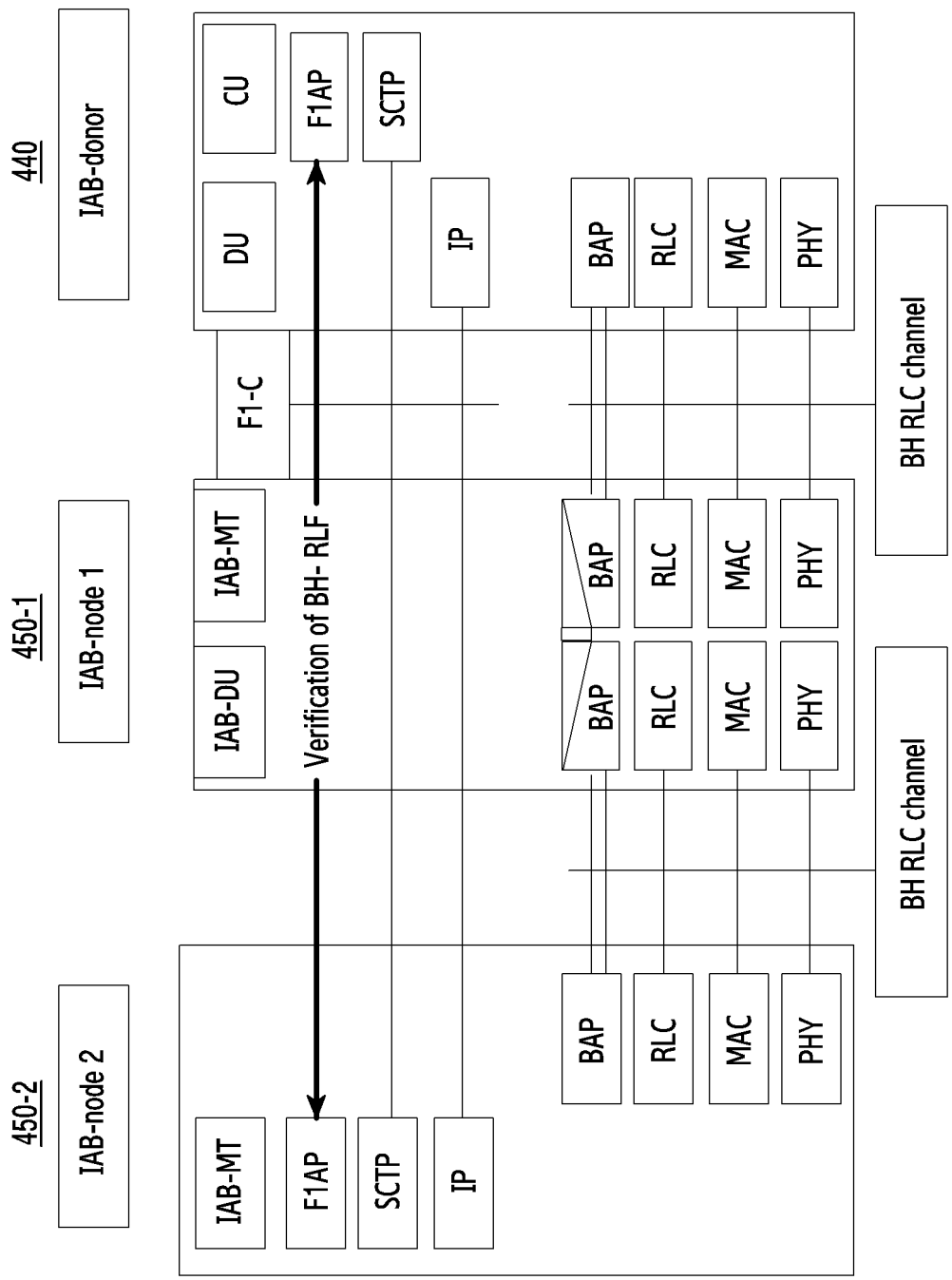
FIG. 4 illustrates verification of a BH-RLF over an F1 application protocol (AP) layer, according to an embodiment.

FIG. 4 illustrates verification of a BH-RLF over an F1 AP layer, according to an embodiment.

Referring to the FIG. 4, upon reception of a BH-RLF indication from any other IAB node or transmitter node, the IAB-node #1 450-1 should trigger a verification of the BH-RLF by sending a verification message over the F1-AP layer to the IAB-node #2 450-2 and the IAB-node 440.

Using an existing message to verify the BH-RLF-F1AP consists of elementary procedures (EPs). An EP is a unit of interaction between a gNB-CU and a gNB-DU. These EPs may be defined separately and are intended to be used to build up complete sequences in a flexible manner.

In the following tables, all EPs are divided into Class 1 and Class 2 Eps.

TABLE 1

Class 1 procedures

| Elementary Procedure | Initiating Message | Successful Outcome Response message | Unsuccessful Outcome Response message |
|---|---|---|---|
| Reset | RESET | RESET ACKNOWLEDGE | |
| F1 Setup | F1 SETUP REQUEST | F1 SETUP RESPONSE | F1 SETUP FAILURE |

In Table 1, existing messages are re-used to verify the authenticity of BH-RLF over an existing path.

Figure 5:
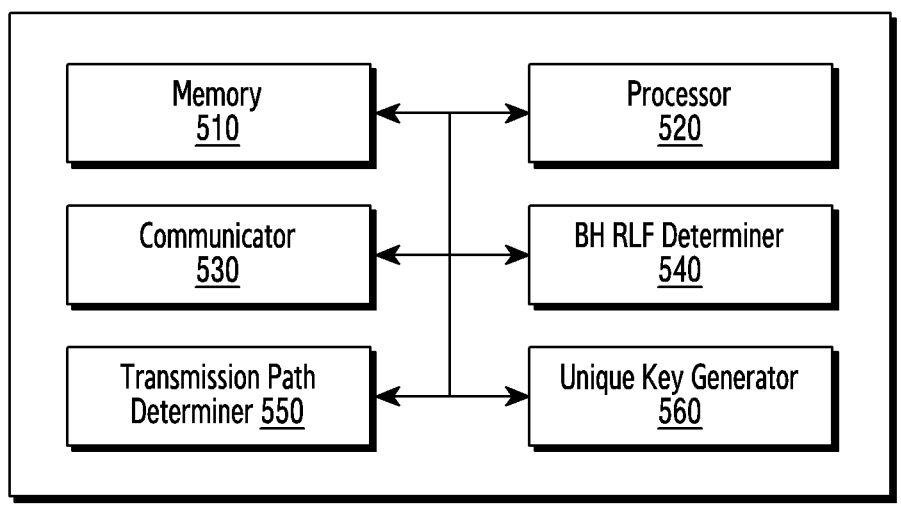
FIG. 5 illustrates an IAB node for verifying a BH-RLF, according to an embodiment.

FIG. 5 illustrates an IAB node for verifying authenticity of a BH-RLF, according to an embodiment.

Referring to FIG. 5, the IAB node includes a memory 510, a processor 520, a communicator 530, a BH-RLF determiner 540, a transmission path determiner 550, and a unique key generator 560.

The memory 510 may store instructions to be executed by the processor 520. The memory 510 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 510 may be considered a non-transitory storage medium. The term "non-transitory" may indicate that the storage medium is not embodied in a carrier wave or a propagated signal. However, the term "non-transitory" should not be interpreted that the memory 510 is non-movable.

The memory 510 may be configured to store larger amounts of information than the memory. For example, a non-transitory storage medium may store data that can, over time, change (e.g., in random access memory (RAM) or cache). The memory 510 can be an internal storage unit or it can be an external storage unit of the IAB node, a cloud storage, or any other type of external storage.

The processor 520 communicates with the memory 510, the communicator 530, the BH-RLF determiner 540, the transmission path determiner 550, and the unique key generator 560. The processor 520 is configured to execute instructions stored in the memory 510 and to perform various processes.

The communicator 530, e.g., a transceiver, is configured for communicating internally between internal hardware components and with external devices via one or more networks.

The communicator 530 is configured to receive a BH-RLF message. The BH-RLF message indicates the BH-RLF between a child IAB node and a parent IAB node. The BH-RLF message may also indicate the BH-RLF between any nodes and the indication is received by the parent IAB node and/or the child IAB node.

The communicator 530 may also be configured to send at least one message to the parent IAB node. The at least one message can be one of a RESET message, an F1 SETUP request message, an ERROR indication message, an RLF query request message, an RRC connection re-establishment request message, an ECHO request, an ICMP echo request, and an RRC BH-RLF query request message.

The BH-RLF determiner 540 is configured to determine whether an acknowledgment is received in response to the at least one message sent. The BH-RLF determiner 540 may be configured to confirm the BH-RLF in response to the determination that the acknowledgment is not received. The BH-RLF determiner 540 may be configured to detect that the BH-RLF message is a fake BH-RLF message in response to the determination that the acknowledgment is received.

The transmission path determiner 550 may be configured to determine an alternative path for transmission of data traffic between the child IAB node and the parent IAB node based on the confirmation. The transmission path determiner 550 may be configured to continue using an existing link for transmission of the data traffic between the child the IAB node and the parent IAB node based on the detection.

The unique key generator 560 may be configured to generate, by inputting at least one of a IAB parent key, a BAP routing identifier (ID), a BAP radio link control (RLC) channel ID, and a gNB-DU UE F1AP ID to a key distribution function (KDF).

Alternatively, upon the unique key being generated, the IAB node may be configured to verify one or more BAP control packet data unit (PDU) messages based on the received unique key. The one or more BAP control PDU messages may be verified at a F1AP layer or at a BAP layer.

Although the FIG. 5 illustrates various hardware components of the IAB node, it is to be understood that other embodiments are not limited thereon. For example, the IAB node may include less or more number of components. Further, the labels or names of the components are used only for illustrative purpose and does not limit the scope of the disclosure. Additionally, one or more components can be combined together to perform same or substantially similar function for optimizing the resource allocation.

Figure 6:
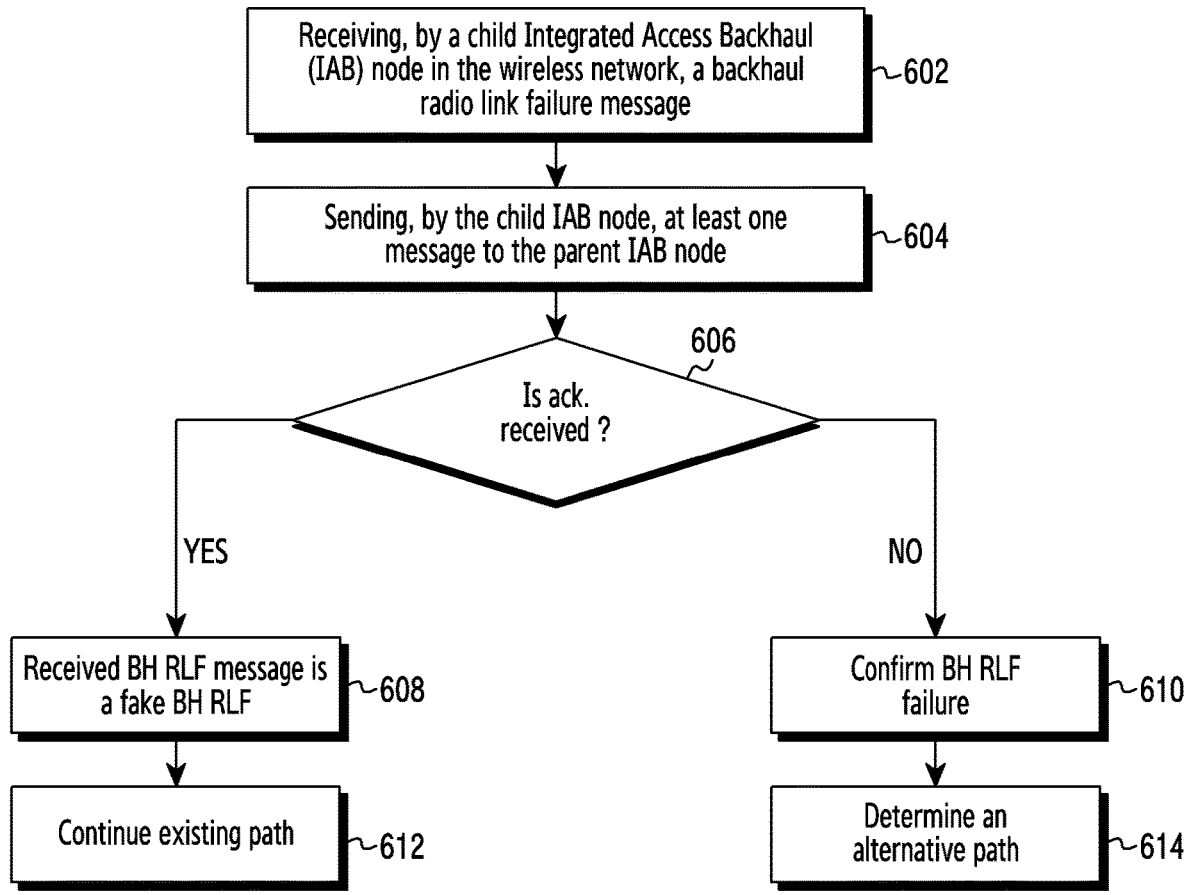
FIG. 6 is a flow diagram illustrating a method for verifying a BH-RLF, according to an embodiment.

FIG. 6 is a flow diagram illustrating a method for verifying authenticity of a BH-RLF, according to an embodiment.

Referring to FIG. 6, in step 602, a child IAB node in the wireless network receives a BH-RLF message. For example, the communicator 530 receives the BH-RLF message indicating the BH-RLF between the child IAB node and a parent IAB node in the wireless network.

In step 604, the child IAB node sends at least one message to the parent IAB node. The at least one message can be one of a RESET message, an F1 SETUP request message, an ERROR indication message, an RLF query request message, an RRC connection re-establishment request message, an ECHO request, an ICMP echo request, and an RRC BH-RLF query request message.

In step 606, the child IAB node determines whether an acknowledgment is received, in response to the at least one message sent. For example, the BH-RLF determiner 540 is configured to determine whether the acknowledgment is received, in response to the at least one message sent.

In step 610, the child IAB node confirms the BH-RLF in response to determining that the acknowledgment is not received. For example, the BH-RLF determiner 540 is configured to confirm the BH-RLF in response to the determination that the acknowledgment is not received.

In step 614, the child IAB node then determines an alternative path for transmission of data traffic between the child IAB node and the parent IAB based on the confirmation. For example, the transmission path determiner 550 is configured to determine the alternative path for transmission of data traffic between the child IAB node and the parent IAB node based on the confirmation.

In step 608, the child IAB node determines that the BH-RLF message is a fake backhaul link failure message in response to determining that the acknowledgment is received in step 606. For example, the BH-RLF determiner 540 is configured to detect that the BH-RLF message is a fake BH-RLF message in response to the determination that the acknowledgment is received.

In step 612, the child IAB node continues an existing link for transmission of the data traffic between the child the IAB node and the parent IAB node based on the detection. For example, the transmission path determiner 550 is configured to continue using an existing link for transmission of the data traffic between the child the IAB node and the parent IAB node based on the detection.

Figure 7:
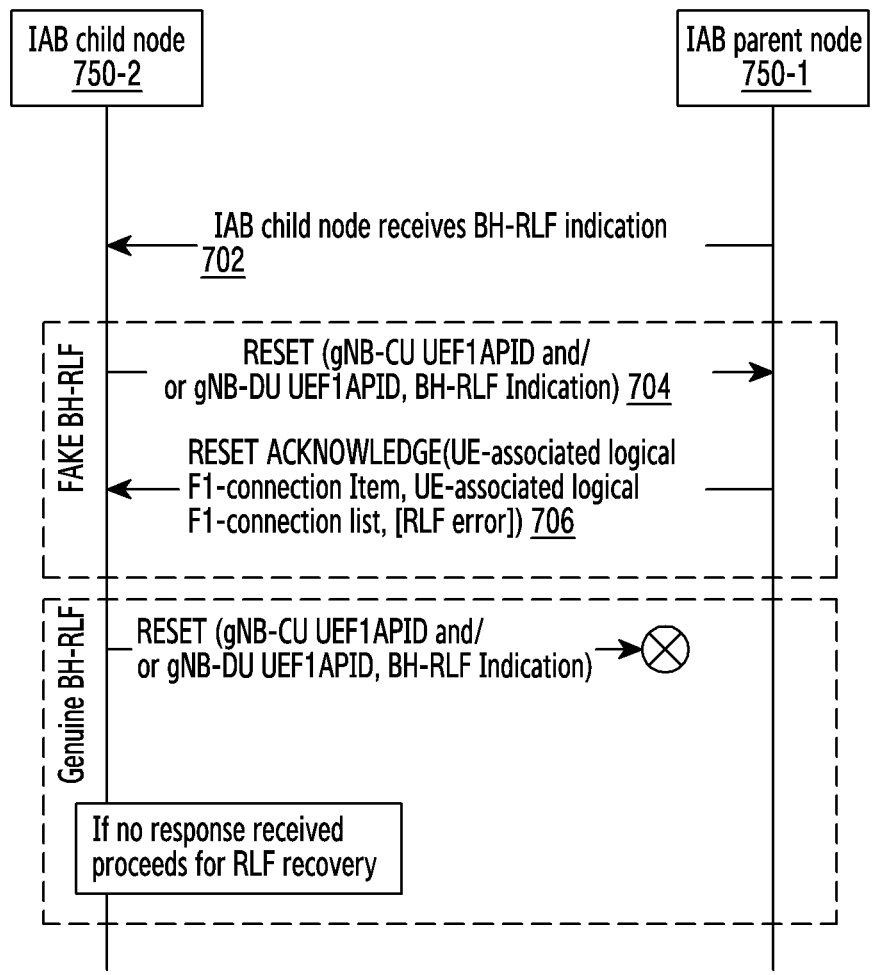
FIG. 7 illustrates verifying a BH-RLF using a RESET procedure, according to an embodiment.

FIG. 7 illustrates verifying authenticity of a BH-RLF using a RESET procedure, according to an embodiment.

Referring to the FIG. 7, a child IAB node 750-2 re-uses a RESET procedure for BH-RLF verification. The purpose of the Reset procedure is to initialize or re-initialize the F1AP UE-related contexts, in the event of a failure in the gNB-CU or gNB-DU. This procedure does not affect the application level configuration data exchanged during, e.g., the F1 Setup procedure.

More specifically, in step 702, the child IAB node 750-2 in the wireless network receives a BH-RLF message from a parent IAB node 750-1. The BH-RLF message indicates that the parent IAB node 750-1 and/or the child IAB node 750-2 receive the indication and the BH-RLF between any nodes.

In step 704, the child IAB node 750-2 sends RESET request to the parent IAB node 750-1 via path 1. In this request, child IAB node 750-2 indicates the BH-RLF is received.

If the BH-RLF received by the child IAB node 750-2 is the one manipulated by an attacker or transmitted by the attacker, in step 706 the child IAB node 750-2 receives a RESET ACKNOWLEDGE as response with an RLF error.

The RLF error indicates that no BH-RLF occurred in path 1. If the child IAB node 750-2 receives a successful response from the parent IAB node 750-1, it should continue the communication over same established path (path1).

Alternatively, the child IAB node 750-2 sets a timer for receiving the response. If there is no response within the time window, the child IAB node 750-2 assumes that the BH-RLF is genuine and tries to re-establish the RRC via a recovery path.

In another embodiment, the above-described procedure may occur before radio link connection release.

Although FIG. 7 illustrates the child IAB node 750-2 receiving the BH-RLF message in step 702, a similar procedure may be performed in response to the parent IAB node 750-1 receiving the BH-RLF message.

Figure 8:
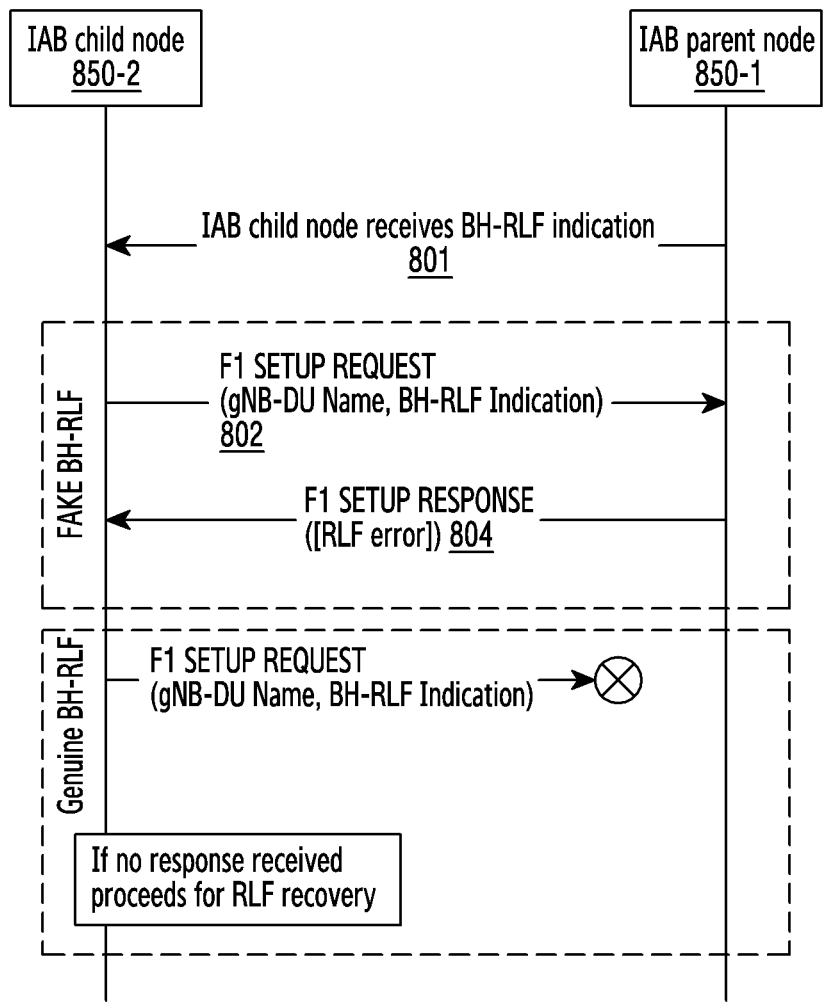
FIG. 8 illustrates verifying a BH-RLF using an F1-Setup procedure, according to an embodiment.

FIG. 8 illustrates verifying authenticity of a BH-RLF using an F1-setup procedure, according to an embodiment.

Referring to the FIG. 8, the child IAB node 850-2 re-uses the F1-SETUP procedure for the BH-RLF verification. The purpose of the F1 Setup procedure is to exchange application level data used for the gNB-DU and the gNB-CU to correctly interoperate on the F1 interface.

More specifically, in step 801, the child IAB node 850-2 receives a BH-RLF message. The BH-RLF message indicates the parent IAB node 850-1 and/or the child IAB node 850-2 receive the indication and the BH-RLF between any nodes.

In step 802, the child IAB node 850-2 sends an F1-SETUP request to the parent IAB node 850-1 via path 1. In this request, child IAB node 850-2 indicates the received BH-RLF.

If the BH-RLF received by the child IAB node 850-2 is the one manipulated/transmitted by the attacker, in step 804, child IAB node 850-2 receives an F1-SETUP response with an RLF error. The RLF error indicates that no BH-RLF occurred in path 1.

If the child IAB node 850-2 receives a successful response from the IAB-parent node 850-1, it should continue the communication over same established path (path 1).

Alternatively, the child IAB node 850-2 sets a timer for receiving the response. If there is no response within the time window, the child IAB node 850-2 assumes that the BH-RLF is genuine and tries to re-establish the RRC via a recovery path.

In another embodiment, the above-mentioned procedure may occur before radio link connection release.

In Table 2, the following existing messages are re-used to verify the authenticity of RLF over the existing path.

TABLE 2

| Class 2 procedures | |
|---|---|
| Elementary Procedure | Message |
| Error Indication | ERROR INDICATION |

Although FIG. 8 illustrates the child IAB node 850-2 receiving the BH-RLF message in step 801, a similar procedure may be performed in response to the parent IAB node 850-1 receiving the BH-RLF message.

Figure 9:
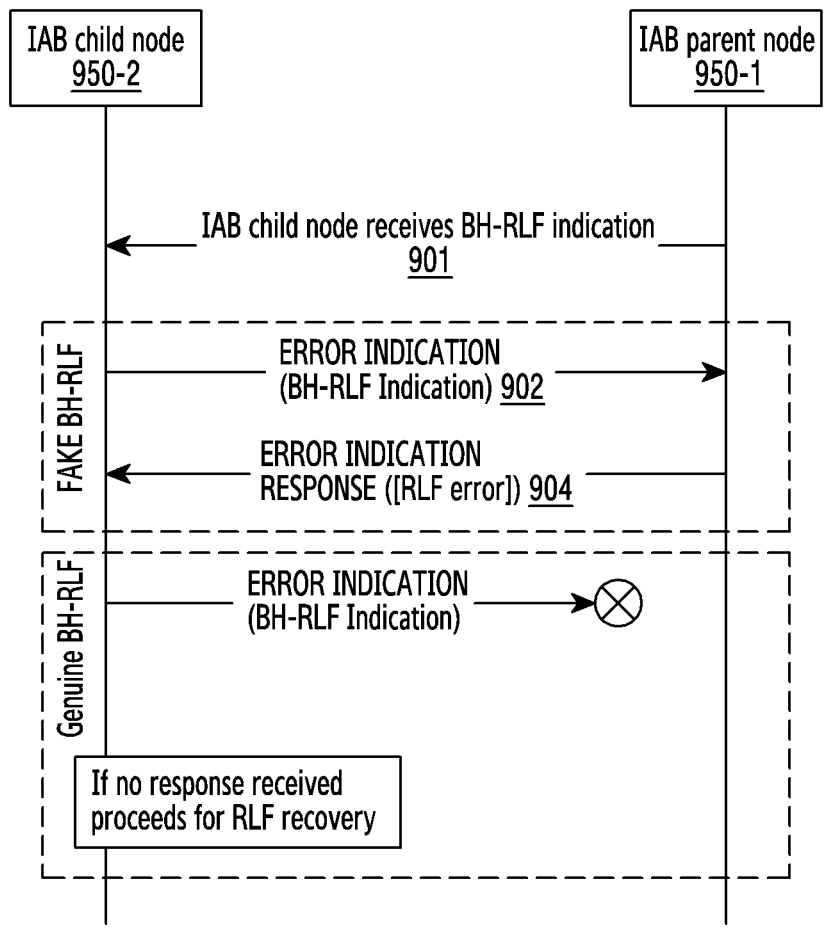
FIG. 9 illustrates verifying a BH-RLF using an error indication procedure, according to an embodiment.

FIG. 9 illustrates verifying authenticity of a BH-RLF using an error indication procedure, according to an embodiment.

Referring to FIG. 9, the child IAB node 950-2 re-uses the ERROR indication procedure for BH-RLF verification. The error indication procedure is initiated by a node in order to report detected errors in one incoming message, provided they cannot be reported by an appropriate failure message.

More specifically, in step 901, the child IAB node 950-2 receives a BH-RLF message. The BH-RLF message indicates the parent IAB node 150-1 and/or the child IAB node 150-2 receive the indication and the BH-RLF between any nodes.

In step 902, the child IAB node 950-2 sends an ERROR INDICATION message to the IAB parent node 950-1 via path 1. The ERROR INDICATION message indicates the received BH-RLF.

If the BH-RLF received by the child IAB node 950-2 is the one manipulated/transmitted by the attacker, in step 904, child IAB node 950-2 receives an ERROR INDICATION response with an RLF error. The RLF error indicates that no BH-RLF occurred in path 1.

If the child IAB node 950-2 receives a successful response from the IAB parent node 950-1, it should continue the communication over same established path (path1).

Alternatively, the child IAB node 950-2 sets a timer for receiving the response. If there is no response within the time window, the child IAB node 950-2 assumes that the BH-RLF is genuine and tries to re-establish the RRC via a recovery path.

In another embodiment, the above-mentioned procedure may occur before radio link connection release.

Although FIG. 9 illustrates the child IAB node 950-2 receiving the BH-RLF message in step 901, a similar procedure may be performed in response to the parent IAB node 950-1 receiving the BH-RLF message.

Figure 10:
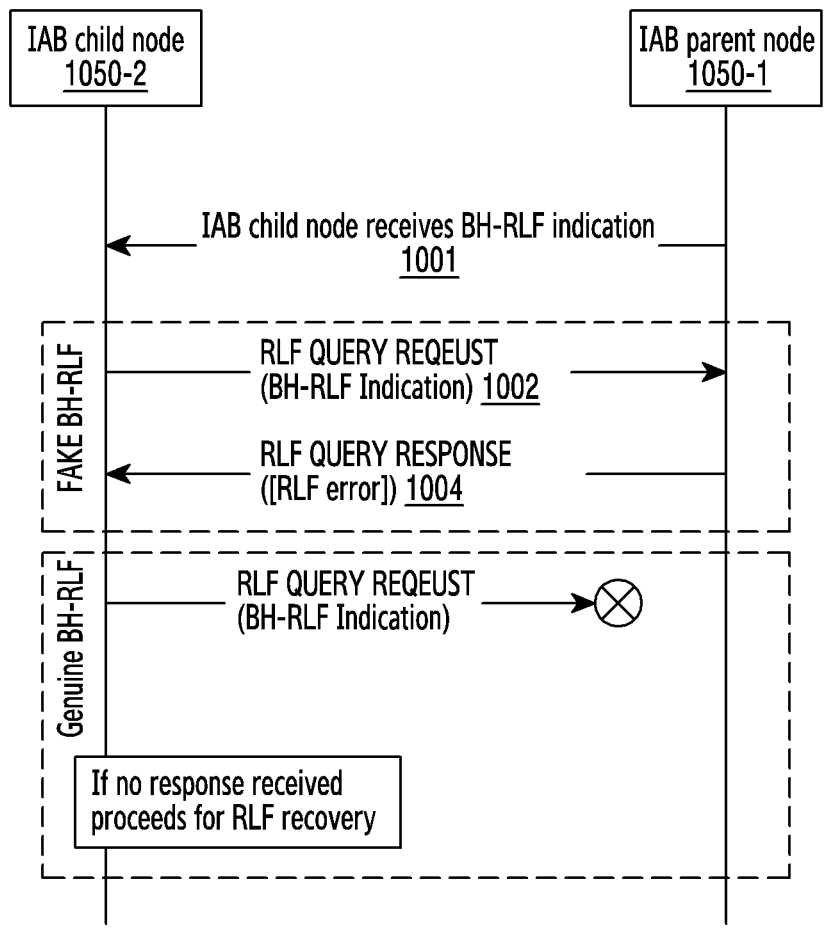
FIG. 10 illustrates verifying a BH-RLF using a new RLF query procedure, according to an embodiment.

FIG. 10 illustrates verifying authenticity of A BH-RLF using anew RLF Query EP, according to an embodiment.

Referring to the FIG. 10, the child IAB node 1050-2 uses a new procedure for BH-RLF verification. The EP indicates about the received BH-RLF to the Donor and/or to verify whether there is an RLF in the established path between the child IAB node 1050-2 and the parent IAB node 1050-1.

More specifically, in step 1001, the child IAB node 1050-2 receives a BH-RLF message. The BH-RLF message indicates the parent IAB node 150-1 and/or the child IAB node 150-2 receive the indication and the BH-RLF between any nodes.

In step 1002, the child IAB node 1050-2 sends an RLF query request to the IAB parent node 1050-1 via path 1. The RLF query request indicates the received BH-RLF.

If BH-RLF received by the child IAB node 1050-2 is the one manipulated/transmitted by the attacker, in step 1004, the child IAB node 1050-2 receives an RLF query response with an RLF error. The RLF error indicates that no BH-RLF occurred in path 1.

If the child IAB node 1050-2 receives a successful response from the IAB parent node 1050-1, it should continue the communication over same established path.

Alternatively, the child IAB node 1050-2 sets a timer for receiving the response. If there is no response within the time window, the child IAB node 1050-2 assumes that the BH-RLF is genuine and tries to re-establish the RRC via a recovery path.

In another embodiment, the above-mentioned procedure may occur before a radio link connection release.

Although FIG. 10 illustrates the child IAB node 1050-2 receiving the BH-RLF indication in step 1001, a similar procedure may be performed in response to the parent IAB node 1050-1 receiving the BH-RLF indication.

Figure 11:
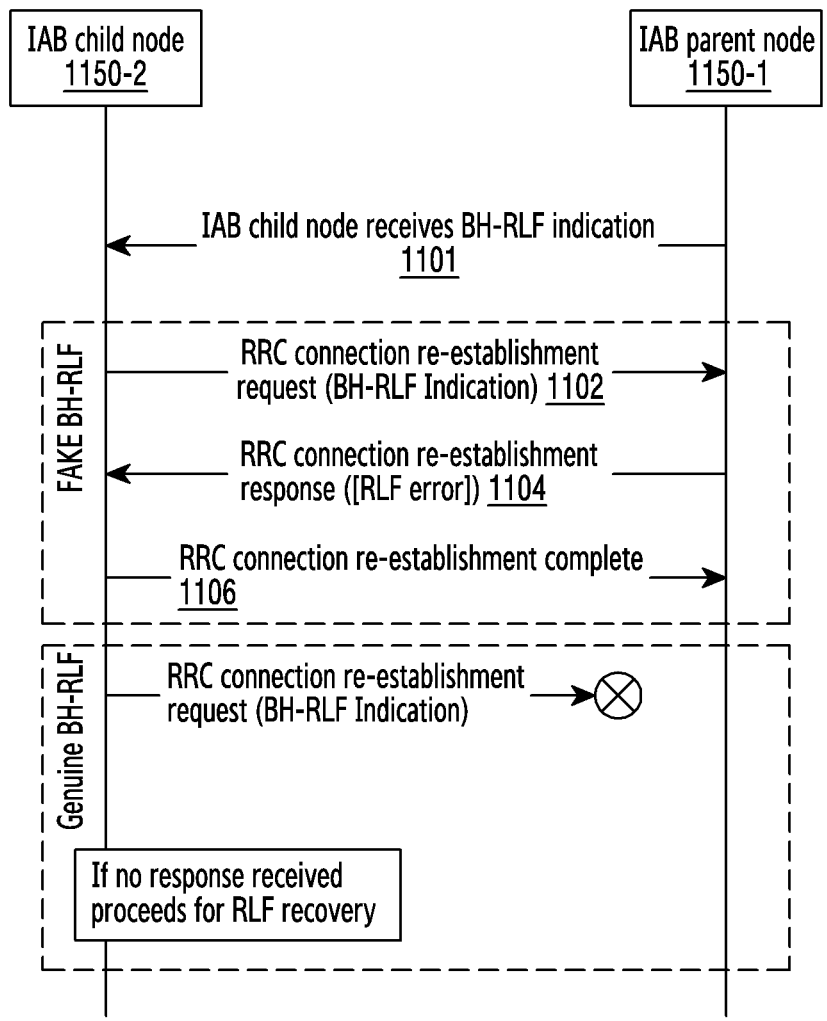
FIG. 11 illustrates verifying a BH-RLF using a radio resource control (RRC) connection re-establishment procedure, according to an embodiment.

FIG. 11 illustrates verifying authenticity of a BH-RLF using an RRC connection re-establishment procedure, according to an embodiment.

Referring to the FIG. 11, the child IAB node 1150-2 performs RRC connection re-establishment.

More specifically, in step 1101, the child IAB node 1150-2 receives a BH-RLF message. The BH-RLF message indicates the parent IAB node 1150-1 and/or the child IAB node 1150-2 receive the indication and the BH-RLF between any nodes.

In step 1102, the child IAB node 1150-2 sends an RRC connection re-establishment request to the parent IAB node 1150-1 via path 1. The RRC connection re-establishment request indicates the received BH-RLF.

If the BH-RLF received by the child IAB node 1150-2 is the one manipulated/transmitted by the attacker, in step 1104, the child IAB node 1150-2 receives an RRC connection re-establishment with an RLF error. The RLF error indicates that no BH-RLF occurred in path 1.

If the child IAB node 1150-2 receives a successful response from the parent IAB node 150-1, it should continue the communication over same established path.

In step 1106, the IAB node 1150-2 may sends a RRC co RRC connection re-establishment complete to the IAB parent node 150-1.

Alternatively, the child IAB node 1150-2 sets a timer for receiving the response. If there is no response within the time window, the child IAB node 1150-2 assumes that the BH-RLF is genuine and tries to re-establish RRC via a recovery path.

In another embodiment, the above-mentioned procedure may occur before a radio link connection release.

Although FIG. 11 illustrates the child IAB node 1150-2 receiving the BH-RLF indication in step 1101, a similar procedure may be performed in response to the parent IAB node 1150-1 receiving the BH-RLF indication.

Figure 12:
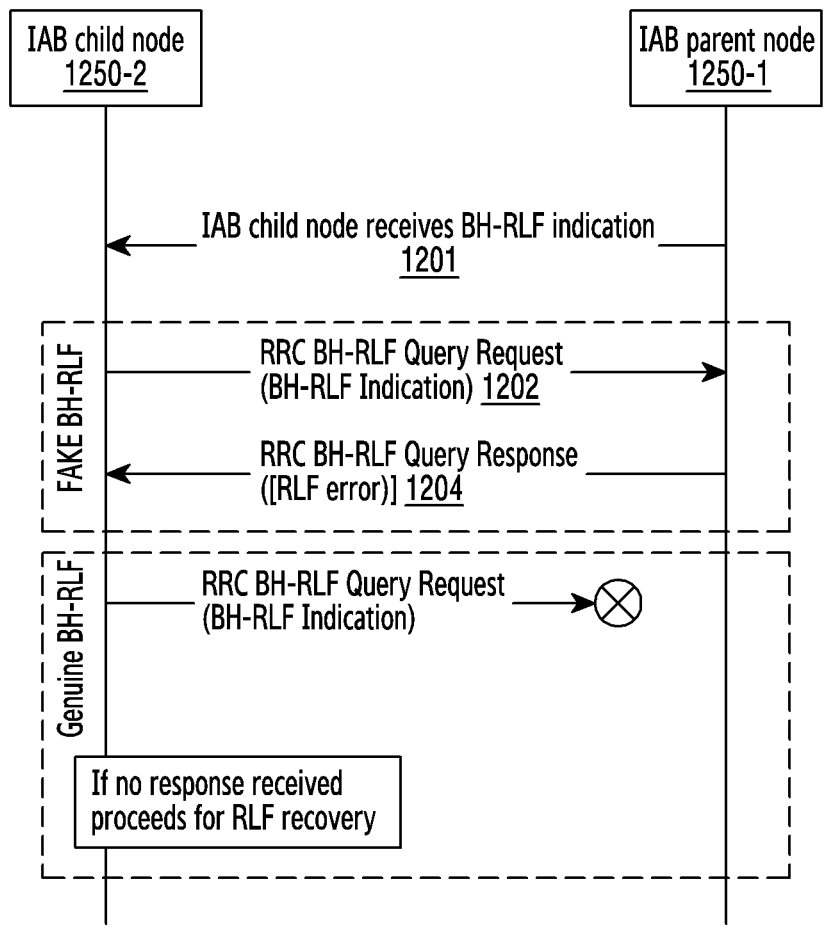
FIG. 12 illustrates verifying a BH-RLF using a new RRC BH-RLF query procedure, according to an embodiment.

FIG. 12 illustrates verifying authenticity of a BH-RLF using a new RRC BH-RLF query procedure, according to an embodiment.

Referring to the FIG. 12, the child IAB node 1250-2 performs an RRC BH-RLF query procedure.

More specifically, in step 1201, the child IAB node 1250-2 receives a BH-RLF message. The BH-RLF message indicates the parent IAB node 1250-1 and/or the child IAB node 1250-2 receive the indication and the BH-RLF between any nodes and the indication.

In step 1202, the child IAB node 1250-2 sends an RRC BH-RLF query request to the parent IAB node 1250-1 via path 1. The RRC BH-RLF query request indicates the received BH-RLF. If BH-RLF received by the child IAB node 1250-2 is the one manipulated/transmitted by the attacker, in step 1104, the child IAB node 1250-2 receives an RRC BH-RLF Query response with an RLF error. The RLF error indicates that no BH-RLF occurred in path 1.

If the child IAB node 1250-2 receives a successful response from the parent IAB node 1250-1, it should continue the communication over same established path.

Alternatively, the child IAB node 1250-2 sets a timer for receiving the response. If there is no response within the time window, the child IAB node 1250-2 assumes that the BH-RLF is genuine and tries to re-establish the RRC via a recovery path.

In another embodiment, the above-mentioned procedure may occur before a radio link connection release.

The child IAB node 1250-2 may also include the indication that the BH-RLF indication is received in any RRC and/or F1AP message and verify whether there is any RLF in the established path between the child IAB node 1250-2 and the parent IAB node 1250-1.

Hash and token-based mechanisms can be used for the verification of the BH-RLF. In an accordance with an embodiment, beforehand, an IAB-Donor distributes a secret key to all of the parent and child nodes. This secret key may be used to verify the $MAC_{BH-RLF}$ received at the BAP layer to verify the integrity of the control messages sent over BAP layer. When there is a BH-RLF, the parent IAB node receives the BH-RLF indication over the BAP layer.

The message sent may include the BAP control PDU data and a $MAC_{BH-RLF}$ generated on the BAP message using the secret key. The verification of $MAC_{BH-RLF}$ can be done at the BAP layer of an IAB node using the secret key and the received BAP message.

In another embodiment, the generation and verification of the BAP message may be performed at an upper layer (e.g., at the F1AP layer or at the RRC layer). That is, at the parent IAB node 1250-1, the BAP layer wants to send the BAP message (e.g., an BH-RLF indication), then it requests the F1AP/RRC layer to generate the MAC for the BAP message for one or more child nodes. Upon receiving the MAC(s) from the F1AP/RRC layer, the BAP layer transmits the BAP message along with the corresponding MAC to the child node(s).

At the child IAB node 1250-2, upon receiving the BAP message along with the MAC, the BAP layer requests the F1AP/RRC layer to generate the MAC for the BAP message received from the parent node.

Upon receiving the request from BAP layer, the F1AP/RRC layer generates the MAC for the BAP message and verifies whether the received MAC from the parent node and generated MAC are identical. If the verification is successful, then the child IAB node 1250-2 can consider the BH-RLF indication as genuine indication and the F1AP/RRC takes further action (e.g., proceeds to re-establish RRC connection over new recovery path). If the MAC verification fails, the F1AP/RRC ignores the received BAP message.

Although FIG. 12 illustrates the child IAB node 1250-2 receiving the BH-RLF indication in step 1201, a similar procedure may be performed in response to the parent IAB node 1250-1 receiving the BH-RLF indication.

Figure 13:
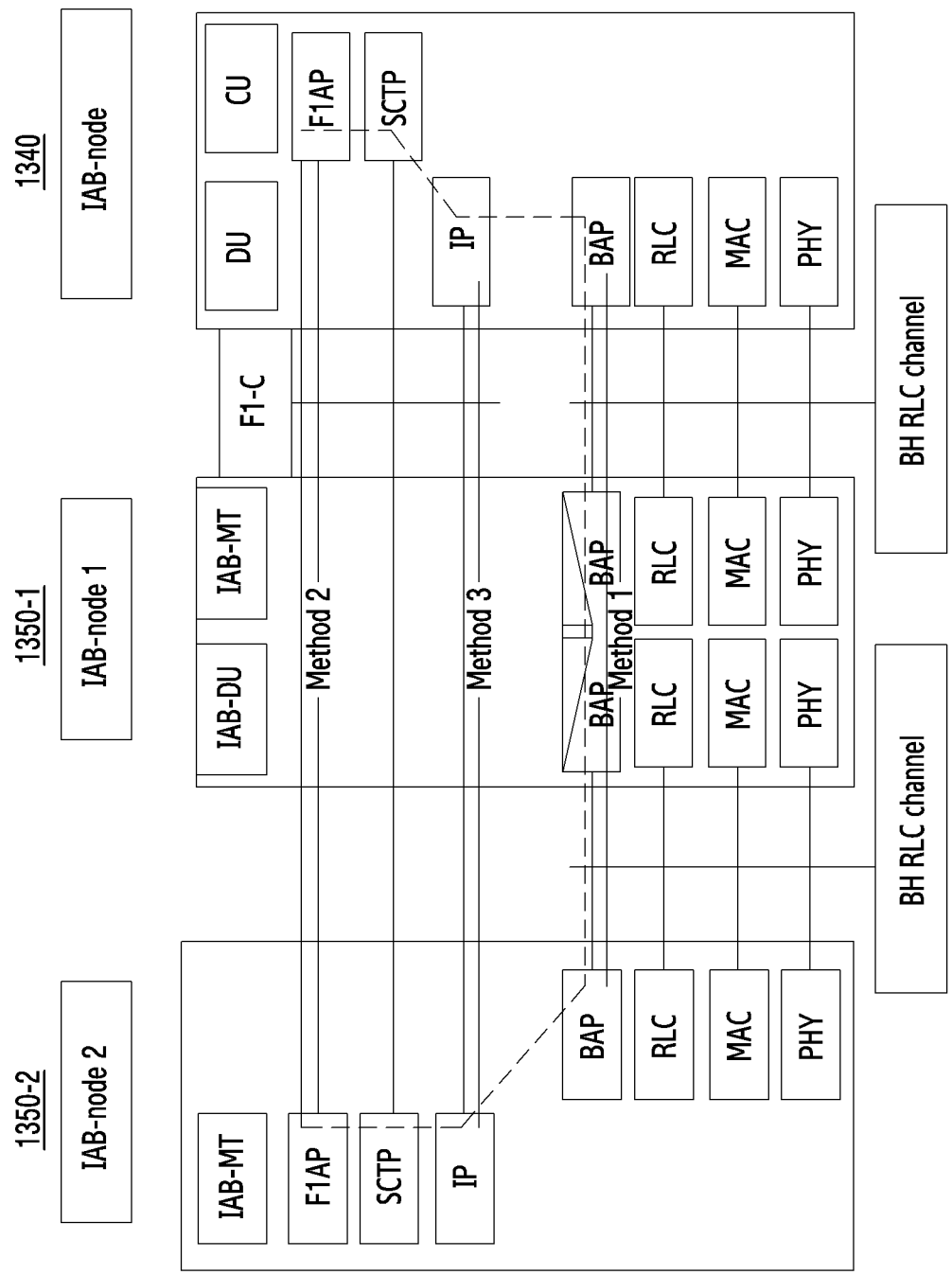
FIG. 13 illustrates verifying a BH-RLF over an F1AP, a BAP, and an Internet protocol (IP) layer, according to an embodiment.

FIG. 13 illustrates verifying a BH-RLF over an F1AP, a BAP and/or an IP layer according to an embodiment.

Referring to the FIG. 13, in Method 1, a unique key is used by the parent IAB node 1350-1 and the child IAB node 1350-2 for protection of the BH-RLF over the BAP layer-verification at the BAP Layer.

More specifically, the IAB donor 1340 generates a unique key for the parent IAB node 1350-1 and provides it to the parent IAB node 1350-1 during establishment of the IAB path.

The unique key is $K_{IAB\text{-}node\ \#1\text{-}P}$. The IAB donor 1340 may generate the $K_{IAB\text{-}node\ \#1\text{-}P}$ in the following ways:

In an embodiment, $K_{gNB}$ is used as a root key and other S inputs can be a unique identifier of the parent node.

$K_{IAB\text{-}node\ \#1\text{-}P}$=KDF {$K_{gNB}$, at least one or more parameter (BAP routing ID, BAP RLC Channel ID), other possible parameters)

When $K_{IAB\text{-}node\ \#1\text{-}P}$ is derived from $K_{gNB}$, the following at least one or more parameters may be used to form the input S to the KDF:
FC=0xYY;
P0=BAP routing ID;
L0=length of "BAP routing ID";
P1=BAP RLC Channel ID;
L1=length of BAP RLC Channel ID;
The input key KEY should be $K_{gNB}$.

In another embodiment, unique key $K_{IAB\text{-}node\ \#1\text{-}P}$ is derived from a random key generator.

Where input to the random key generated can be a unique ID of the parent node such as BAP routing ID, BAP RLC Channel ID, other possible parameters to maintain the uniqueness of the key.

In another embodiment, the key at child node (IAB-node #2 as in FIG. 5) is generated as follows:

$K_{IAB\text{-}node\ \#2\text{-}\#1C}$=KDF {$K_{IAB\text{-}node\ \#1\text{-}P}$, at least one or more parameter (BAP routing ID, BAP RLC Channel ID), <other possible parameters>)

Based on the unique $K_{IAB\text{-}node\ \#1\text{-}P}$, BAP routing ID, BAP RLC Channel ID for every BH-Link between parent and a child node there is a unique key for protecting the BAP control PDU over BAP layer.

$K_{IAB\text{-}node\ \#2\text{-}\#1C}$ is generated by the IAB donor 1340 and provided to the child IAB node 1350-2 during establishment of the IAB path (e.g., path #1 as in FIG. 5) for verification of BAP messages received from the parent IAB node 1350-1.

The parent IAB node 1350-1 may generate the child node key ($K_{IAB\text{-}node\ \#2\text{-}\#C}$ generated by IAB donor 1340 and provided to the child IAB node 1350-2). The generation of child node key is possible at the parent IAB node 1350-1, as it is aware of the root key and the BAP routing ID, BAP RLC Channel ID, or any other unique ID for the particular BH-RLC link.

The IAB donor 1340 may provide the $K_{IAB\text{-}node\ \#2\text{-}\#1C}$ to the child IAB node 1350-2 and the $K_{IAB\text{-}node\ \#1\text{-}P}$ to the parent IAB node 1350-1 using at least one of F1AP message, when performing F1AP EP, and an RRC message, when performing an RRC procedure.

The F1AP layer and/or RRC layer provides the received key $K_{IAB\text{-}node\ \#2\text{-}\#1C}$ or $K_{IAB\text{-}node\ \#1\text{-}P}$ to the BAP layer to perform protection or verification of the BAP messages.

The parent IAB node 1350-1 generates (if not available already) $K_{IAB\text{-}node\ \#2\text{-}\#1C}$ using $K_{IAB\text{-}node\ \#1\text{-}P}$ and other possible parameters, when the parent IAB node 1350-1 determines to send a BH-RLF indication in a BAP control PDU to the child IAB node 1350-2. The parent IAB node 1350-1 uses the key $K_{IAB\text{-}node\ \#2\ \#1C}$ to protect the BAP control PDU message (e.g., integrity protection and/or encryption). The parent IAB node 1350-1 includes the generated message authentication code (MAC) along with the BAP control PDU message, if integrity protection is applied. Part of the MAC is included if there is constrain in the length of the message to be transmitted. At the receiving end (e.g., the child IAB node 1350-2), the BAP control PDU authenticity is verified at the BAP layer using the key $K_{IB\text{-}node\ \#2\text{-}\#1C}$ (received during establishment of the IAB path from IAB donor 1340) As shown in Method 2, in FIG. 13, the unique key is used by the parent IAB node 1350-1 and the child IAB node 1350-2 for protection of the BH-RLF over the BAP layer-verification at the F1AP.

The unique key may also be provided to each of the parent IAB node 1350-1 and the child IAB node 1350-2 for protection of the BH-RLF over the BAP layer, and verification happens at the F1AP level.

The IAB donor 1340 may generate a unique key for the parent IAB node 1350-1 and provide it to the parent IAB node 1350-1 during establishment of the IAB path.

The unique key is $K_{IAB\text{-}node\ \#1\text{-}P}$ The IAB donor may generate the $K_{IAB\text{-}node\ \#1\text{-}P}$ in the following ways:

In an embodiment, $K_{gNB}$ is used as the root key and other S inputs can be a unique identifier of the parent node.

$K_{IAB\text{-}node\ \#1\text{-}P}$=KDF {$K_{gNB}$, at least one or more parameter (BAP Routing ID, BAP RLC Channel ID), gNB-DU UE F1AP ID, other possible parameters}

When $K_{IAB\text{-}node\ \#1}$ is derived from $K_{gNB}$, the following at least one or more parameters may be used to form the input S to the KDF:
FC=0xYY;
P0=BAP routing ID;
L0=length of "BAP routing ID";
P1=BAP RLC Channel ID;
L1=length of "BAP RLC Channel ID";
P2=gNB-DU UE F1AP ID;
L2=length of "gNB-DU UE F1AP ID";
The input key KEY should be $K_gNB$.

In another embodiment, unique key $K_{IAB\text{-}node\ \#1\text{-}P}$ is derived from a random key generator.

Where input to the random key generated can be a unique ID of the parent node such as BAP routing ID, BAP RLC Channel ID, gNB-DU UE F1AP ID, other possible parameters to maintain the uniqueness of the key.

In an embodiment, the key at child IAB node 1350-2 is generated as follows:

$K_{IAB\text{-}node\ \#2\text{-}\#1C}$=KDF {$K_{IAB\text{-}node\ \#1\text{-}P}$, at least one or more parameter (BAP routing ID, BAP RLC Channel ID, gNB-DU UE F1AP ID), <other possible parameters>}

Based on the unique $K_{IAB\text{-}node\ \#1}$-p, BAP routing ID, BAP RLC Channel ID, gNB-DU UE F1AP ID for every BH-Link between parent and child nodes there is a unique key for protecting the BAP control PDU over BAP layer.

$K_{IAB\text{-}node\ \#2\text{-}\#1C}$ is generated by the IAB donor 1340 and provided to child IAB node 1350-2 during establishment of the IAB path for verification of BAP messages received from the parent IAB node 1350-1.

In an embodiment, the parent IAB node 1350-1 generates the child IAB node key ($K_{IAB\text{-}node\ \#2\text{-}\#1C}$ generated by IAB donor 1340 and provided to the child IAB node 1350-2). The generation of the child IAB node key is possible at the parent IAB node 1350-1, as it is aware of the root key and the BAP routing ID, BAP RLC Channel ID, or any other unique ID for the particular BH-RLC link.

When the child IAB node 1350-2 receives the BH-RLF indication in a BAP control PDU, the parent IAB node 1350-1 uses the $K_{IAB\text{-}node\ \#2\text{-}\#1C}$ as defined in this embodiment to protect the BAP control PDU message. At the receiving end, the BAP control PDU authenticity is verified at the F1AP level of child IAB node 1350-2 using same key $K_{IAB\text{-}node\ \#2\text{-}\#1C}$.

Figure 14:
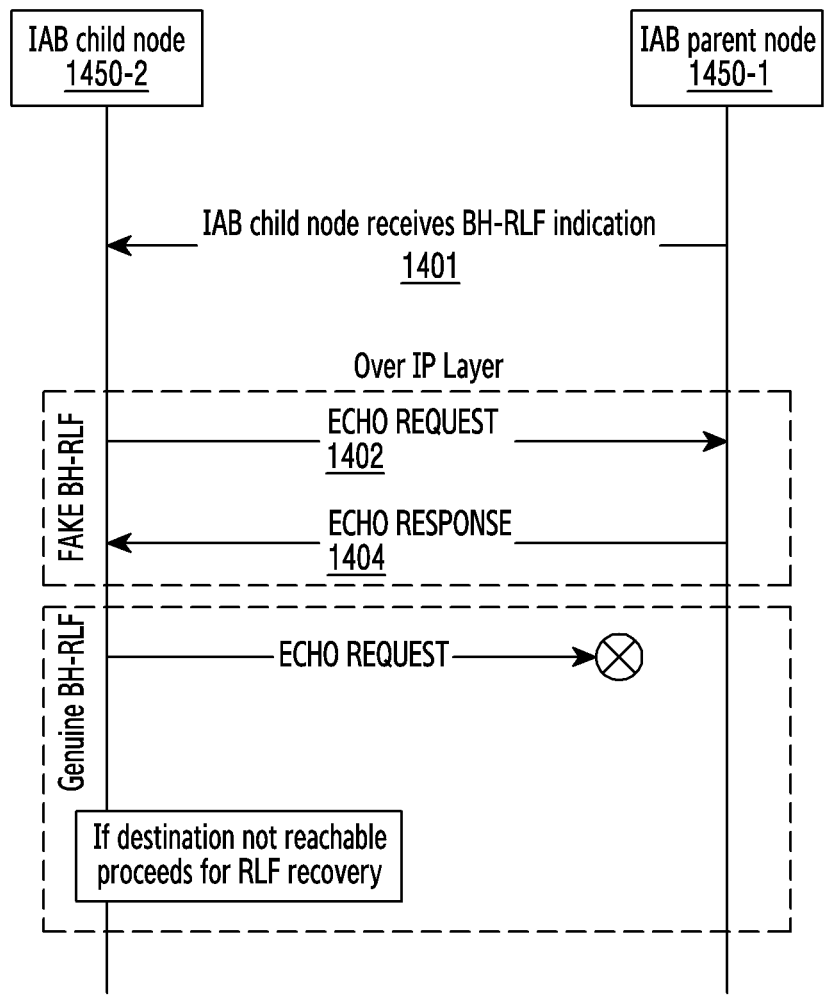
FIG. 14 illustrates verifying a BH-RLF using an ECHO ping over an IP layer-ECHO, according to an embodiment.

FIG. 14 illustrates a scenario of verifying the authenticity of BH-RLF using ECHO procedure, according to the embodiments as disclosed herein.

Referring to the FIG. 14, based on Method 3 in FIG. 13, an ECHO ping message is used to verify authenticity of a BH-RLF.

After receiving a BH-RLF indication, the child IAB node 1450-2 uses ICMP based ping messages over an IP layer to re-check the reachability of the parent IAB node 1450-1.

More specifically, in step 1402, the child IAB node 1450-2 sends an ECHO request to the IAB parent node 1450-1 via path 1.

If the BH-RLF received by the child IAB node 1450-2 is the one manipulated by the attacker, in step 1404, the child IAB node 1450-2 may receive ECHO back as a response within a given time window.

If the child IAB node 1450-2 receives a successful response from the parent IAB node 1450-1, it should continue the communication over same established path.

If there is no response within the time window, the child IAB node 1450-2 assumes that the BH-RLF is genuine and tries to re-establish RRC via a recovery path.

Figure 15:
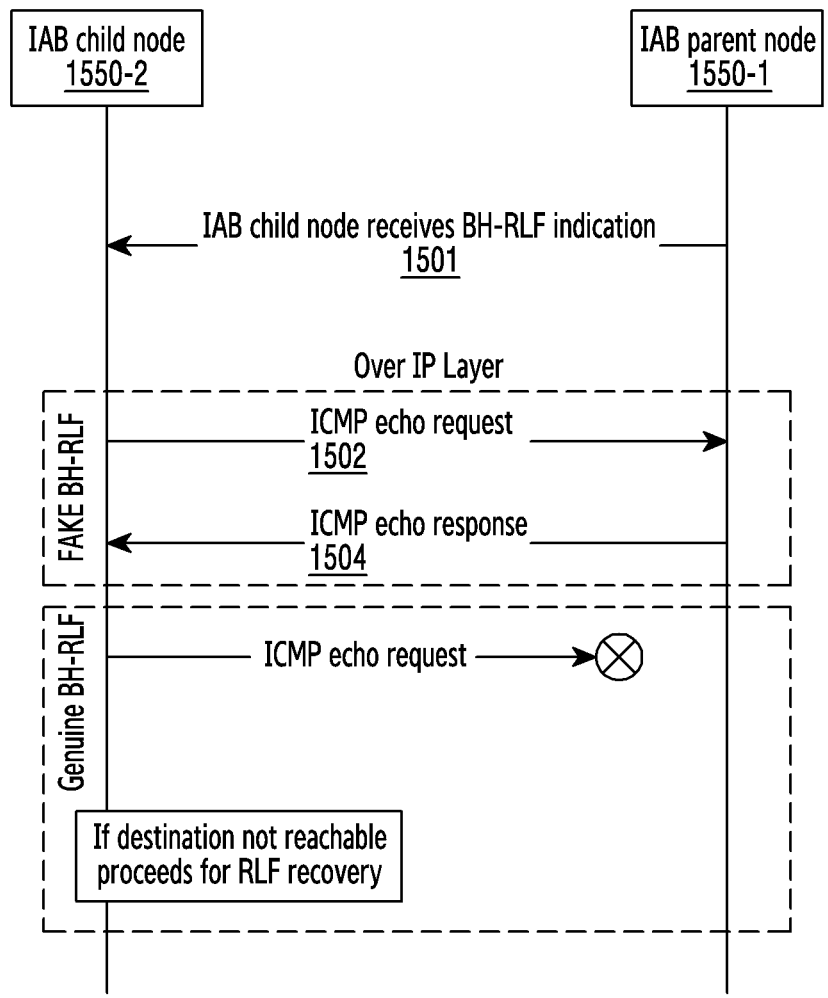
FIG. 15 illustrates verifying a BH-RLF using an Internet control message protocol (ICMP) ping over an IP layer-Trace Route, according to an embodiment.

FIG. 15 illustrates verifying authenticity of a BH-RLF using an ICMP procedure, according to an embodiment.

Referring to the FIG. 15, based on Method 3 in FIG. 13, an ICMP ping message may be used to verify the authenticity of the BH-RLF.

After receiving an BH-RFL indication, the child IAB node 1550-2 uses ICMP based ping messages over an IP layer to re-check the reachability of the parent IAB node 1550-1.

More specifically, in step 1502, the child IAB node 1550-2 sends an ICMP ECHO request to the parent IAB node 1550-1 via path 1.

If BH-RLF received by the child IAB node 1550-2 is the one manipulated by the attacker, in step 1504, the child IAB node 1550-2 may receive an ICMP ECHO back as response within a given time window.

If the child IAB node 1550-2 receives a successful response from the parent IAB node 1550-1, it should continue the communication over same established path.

However, if there is no response within the time window, the child IAB node 1550-2 assumes that the BH-RLF is genuine and tries to re-establish RRC via a recovery path.

If the child IAB bode 1550-2 receives the BH-RLF indication in the BAP control PDU message, then the BAP layer provides the indication to the F1AP layer (upper layer). The F1AP layer is capable of verify the authenticity of the received indication using F1AP EP, then F1AP verifies the authenticity and take further action. If the F1AP layer is not capable of verify the authenticity of the received indication, then the F1AP layer request either the IP layer or RRC layer to verify the authenticity of the received indication.

Upon receiving the request from the F1AP layer, the IP layer verifies the authenticity (e.g., by initiating an ICMP echo/ping message) and provides the verification result to the F1AP to take further action.

Upon receiving the request from the F1AP layer, the RRC layer verifies the authenticity (e.g., by initiating an RRC procedure) and provides the verification result to the F1 AP to take further action or RRC layer initiate the path switch procedure by initiating the RRC re-establishment procedure with the recovery node.

Figure 16:
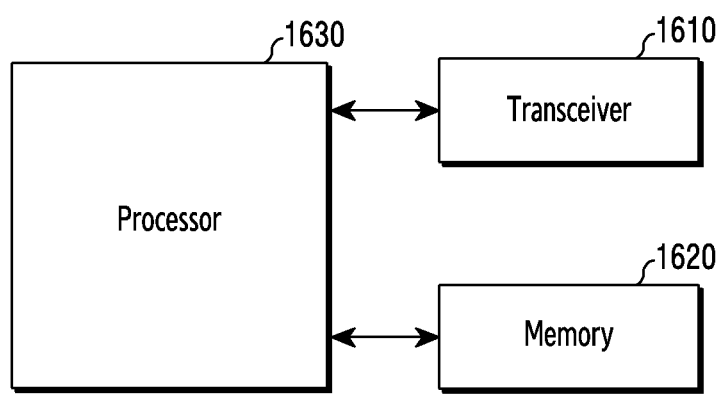
FIG. 16 illustrates a UE according to an embodiment.

FIG. 16 illustrates a UE according to an embodiment.

Referring to FIG. 16, the UE includes a transceiver 1610, a memory 1620, and a processor 1630. The transceiver 1610, the memory 1620, and the processor 1630 of the UE may operate according to the communication methods of the UE described above. However, the components of the UE are not limited thereto. For example, the UE may include more or fewer components than those described above. In addition, the processor 1630, the transceiver 1610, and the memory 1620 may be implemented as a single chip. Also, the processor 1630 may include multiple processors.

The transceiver 1610 collectively refers to a UE receiver and a UE transmitter, and may transmit/receive a signal to/from a base station or a network entity. The signal transmitted or received to or from the base station or a network entity may include control information and data. The transceiver 1610 may include a radio frequency (RF) transmitter for up-converting and amplifying a frequency of a transmitted signal, and an RF receiver for amplifying low-noise and down-converting a frequency of a received signal. However, this is only an example of the transceiver 1610 and components of the transceiver 1610 are not limited to the RF transmitter and the RF receiver.

The transceiver 1610 may receive and output, to the processor 1630, a signal through a wireless channel, and transmit a signal output from the processor 1630 through the wireless channel.

The memory 1620 may store a program and data used for operations of the UE. The memory 1620 may store control information or data included in a signal obtained by the UE. The memory 1620 may be a storage medium, such as read-only memory (ROM), RAM, a hard disk, a compact disc (CD)-ROM, a digital versatile disc (DVD), or a combination of storage media.

The processor 1630 may control a series of processes such that the UE operates as described above. For example, the transceiver 1610 may receive a data signal including a control signal transmitted by the base station or the network entity, and the processor 1630 may determine a result of receiving the control signal and the data signal transmitted by the base station or the network entity.

Figure 17:
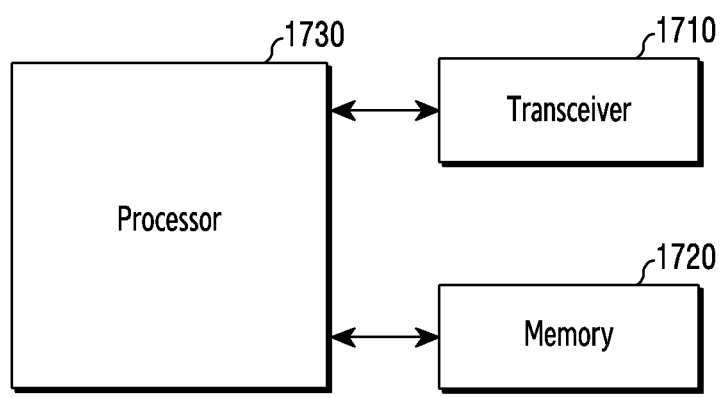
FIG. 17 illustrates a base station according to an embodiment.

FIG. 17 illustrates a base station according to an embodiment.

Referring to FIG. 17, the base station includes a transceiver 1710, a memory 1720, and a processor 1730. The transceiver 1710, the memory 1720, and the processor 1730 of the base station may operate according to the communication methods of the base station described above. However, the components of the base station are not limited thereto. For example, the base station may include more or fewer components than those described above. In addition, the processor 1730, the transceiver 1710, and the memory 1720 may be implemented as a single chip. Also, the processor 1730 may include multiple processors.

The transceiver 1710 collectively refers to a base station receiver and a base station transmitter, and may transmit/receive a signal to/from a UE or a network entity. The signal transmitted or received to or from the UE or a network entity may include control information and data. The transceiver 1710 may include an RF transmitter for up-converting and amplifying a frequency of a transmitted signal, and an RF receiver for amplifying low-noise and down-converting a frequency of a received signal. However, this is only an example of the transceiver 1710 and components of the transceiver 1710 are not limited to the RF transmitter and the RF receiver.

The transceiver 1710 may receive and output, to the processor 1730, a signal through a wireless channel, and transmit a signal output from the processor 1730 through the wireless channel.

The memory 1720 may store a program and data used for operations of the base station. The memory 1720 may store control information or data included in a signal obtained by the base station. The memory 1720 may be a storage medium, such as ROM, RAM, a hard disk, a CD-ROM, a DVD, or a combination of storage media.

The processor 1730 may control a series of processes such that the base station operates as described above. For example, the transceiver 1710 may receive a data signal including a control signal transmitted by the UE, and the processor 1730 may determine a result of receiving the control signal and the data signal transmitted by the UE.

The above described description of the disclosure, while indicating different embodiments and numerous specific details thereof, are given by way of illustration and not of limitation. Various changes and modifications may be made within the scope of the embodiments herein without departing from the spirit thereof, and the embodiments herein include all such modifications.

Additionally, effects obtainable from the disclosure are not limited to the above-mentioned effects, and other effects which are not explicitly mentioned herein may be clearly understood by those skilled in the art of the present disclosure through the above descriptions.

According to various embodiments, a method performed by a child IAB for verifying authenticity of a BH-RLF in a wireless network, wherein the method comprising: receiving a BH-RLF message indicating the BH-RLF between the child IAB node and a parent IAB node; transmitting at least one message to the parent IAB node; determining whether an acknowledgment is received in response to the at least one message; confirming the BH-RLF, in response to determining that the acknowledgment is not received; and detecting that the BH-RLF message is a fake backhaul link failure message, in response to determining that the acknowledgment is received.

In one embodiment, wherein the at least one message includes at least one of a RESET message, an F1 SETUP request message, an ERROR indication message, an RLF query request message, a radio resource control (RRC) connection re-establishment request message, an ECHO request, an Internet control message protocol (ICMP) echo request, or an RRC BH-RLF query request message.

In one embodiment, wherein the acknowledgment includes at least one of a RESET acknowledgment, an F1 SETUP RESPONSE, an ERROR indication response message, an RLF query response message, an RRC connection re-establishment response message, an ICMP ECHO response, or an RRC BH-RLF query response message.

In one embodiment, the method further comprising: determining an alternative path for transmission of data traffic between the child IAB node and the parent IAB node, based on confirming the BH-RLF; and continuing use of an existing link for transmission of the data traffic between the child the IAB node and the parent IAB node, based on detecting that the BH-RLF message is the fake backhaul link failure message.

In one embodiment, wherein the at least one message is transmitted over at least one of an F1AP layer, a backhaul adaptation protocol (BAP) layer, or an IP layer.

In one embodiment, the method further comprising: receiving, from the IAB parent node, a unique key generated by inputting at least one of an IAB parent key, a BAP routing ID, a BAP RLC channel ID, or a gNB-DU UE F1AP ID to a KDF, wherein the unique key is received using at least one of an F1AP message and an RRC message; and verifying authenticity of one or more BAP control packet data unit (PDU) messages based on the received unique key, wherein the one or more BAP control PDU messages are verified at one of a BAP layer or an F1AP layer.

According to various embodiments, a child IAB for verifying authenticity of a BH-RLF in a wireless network, the child IAB comprising: at least one memory; at least one transceiver; and at least one processor operably coupled to the at least one transceiver, configured to receive a BH-RLF message indicating the BH-RLF between the child IAB node and a parent IAB node, transmit at least one message to the parent IAB node, determine whether an acknowledgment is received in response to the at least one message, confirm the BH-RLF, in response to determining that the acknowledgment is not received, and detect that the BH-RLF message is a fake backhaul link failure message, in response to determining that the acknowledgment is received.

In one embodiment, wherein the at least one message includes at least one of a RESET message, an F1 SETUP request message, an ERROR indication message, an RLF query request message, an RRC connection re-establishment request message, an ECHO request, an ICMP echo request, or an RRC BH-RLF query request message.

In one embodiment, wherein the acknowledgment includes at least one of a RESET acknowledgment, an F1 SETUP RESPONSE message, an ERROR indication response message, an RLF query response message, an RRC connection re-establishment response message, an ICMP ECHO response message, or an RRC BH-RLF query response message.

In one embodiment, wherein the at least one processor is further configured to: determine an alternative path for transmission of data traffic between the child IAB node and the parent IAB node based on the confirmation of the BH-RLF; and continue to use an existing link for transmission of the data traffic between the child the IAB node and the parent IAB node based on the detection that the BH-RLF message is the fake backhaul link failure message.

In one embodiment, wherein the at least one message is transmitted over at least one of an F1 application protocol (F1AP) layer, a backhaul adaptation protocol (BAP) layer, or an Internet protocol (IP) layer.

In one embodiment, wherein the at least one processor is further configured to: receive, from the IAB parent node, a unique key that is generated by inputting at least one of an IAB parent key, a BAP routing ID, a BAP RLC channel ID, or a gNB-DU UE F1AP ID to a KDF, wherein the unique key is received using at least one of an F1AP message or an RRC message; and verify authenticity of one or more BAP control PDU messages based on the received unique key, wherein the one or more BAP control PDU messages are verified at one of a BAP layer or an F1AP layer.

According to various embodiments, a method performed by a parent IAB for verifying authenticity of a BH-RLF in a wireless network, wherein the method comprising: transmitting a BH-RLF message indicating the BH-RLF between a child IAB node and the parent IAB node; and receiving at least one message from the child IAB node.

In one embodiment, wherein the at least one message includes at least one of a RESET message, an F1 SETUP request message, an ERROR indication message, an RLF query request message, a radio resource control (RRC) connection re-establishment request message, an ECHO request, an Internet control message protocol (ICMP) echo request, or an RRC BH-RLF query request message.

In one embodiment, wherein the at least one message is received over at least one of an F1AP layer, a backhaul adaptation protocol (BAP) layer, or an IP layer.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a child integrated access backhaul (IAB) node in a wireless communication system, the method comprising:
receiving, from a parent IAB node, a unique key based on a unique identifier (ID) of the parent IAB node and a key distribution function (KDF);
verifying an authenticity of a backhaul adaptation protocol (BAP) control protocol data unit (PDU) message based on the unique key;
receiving, from the parent IAB node, a first message indicating a backhaul-radio link failure (BH-RLF) between the child IAB node and the parent IAB node;
transmitting, to the parent IAB node, a second message for the BH-RLF; and
in case that an acknowledgment for the second message is received as a response to the second message, detecting that the first message is a fake backhaul link failure message.

2. The method of claim 1, wherein the second message includes at least one of a RESET message, an F1 SETUP request message, an ERROR indication message, an RLF query request message, a radio resource control (RRC) connection re-establishment request message, an ECHO request message, an Internet control message protocol (ICMP) echo request message, or an RRC BH-RLF query request message.

3. The method of claim 2, wherein the acknowledgment includes at least one of a RESET acknowledgment, an F1 SETUP RESPONSE, an ERROR indication response message, an RLF query response message, an RRC connection re-establishment response message, an ICMP ECHO response message, or an RRC BH-RLF query response message.

4. The method of claim 1, further comprising
continuing use of an existing link for transmission of the data traffic between the child the IAB node and the parent IAB node.

5. The method of claim 1, wherein the second message is transmitted over at least one of an F1 application protocol (F1AP) layer, a BAP layer, or an Internet protocol (IP) layer.

6. The method of claim 1, wherein the unique key is generated by inputting the unique ID of the parent IAB node to the KDF, the unique ID including at least one of an IAB parent key, a BAP routing ID, a BAP radio link control (RLC) channel ID, or a gNB-data unit (DU) user equipment (UE) F1 application protocol (F1AP) ID,
wherein the unique key is received via at least one of an F1AP message or an RRC message, and
wherein the BAP control PDU message is verified at one of a BAP layer or an F1AP layer.

7. A child integrated access backhaul (IAB) node in a wireless communication system, the child IAB node comprising:
a transceiver; and
a controller coupled with the transceiver, and configured to:
receive, from a parent IAB node, a unique key based on a unique identifier (ID) of the parent IAB node and a key distribution function (KDF),
verify an authenticity of a backhaul adaptation protocol (BAP) control protocol data unit (PDU) message based on the unique key,
receive, from the parent IAB node, a first message indicating a backhaul-radio link failure (BH-RLF) between the child IAB node and the parent IAB node,
transmit, to the parent IAB node, a second message for the BH-RLF, and
in case that an acknowledgment for the second message is received as a response to the second message, detect that the first message is a fake backhaul link failure message.

8. The child IAB node of claim 7, wherein the second message includes at least one of a RESET message, an F1 SETUP request message, an ERROR indication message, an RLF query request message, a radio resource control (RRC) connection re-establishment request message, an ECHO request message, an Internet control message protocol (ICMP) echo request message, or an RRC BH-RLF query request message.

9. The child IAB node of claim 8, wherein the acknowledgment includes at least one of a RESET acknowledgment, an F1 SETUP RESPONSE message, an ERROR indication response message, an RLF query response message, an RRC connection re-establishment response message, an ICMP ECHO response message, or an RRC BH-RLF query response message.

10. The child IAB node of claim 7, wherein the controller is further configured to continue to use an existing link for transmission of the data traffic between the child the IAB node and the parent IAB node.

11. The child IAB node of claim 7, wherein the second message is transmitted over at least one of an F1 application protocol (F1AP) layer, a BAP layer, or an Internet protocol (IP) layer.

12. The child IAB node of claim 7, wherein the unique key is generated by inputting the unique ID of the parent IAB node to the KDF, the unique ID including at least one of an IAB parent key, a BAP routing ID, a BAP radio link control (RLC) channel ID, or a gNB-data unit (DU) user equipment (UE) F1 application protocol (F1AP) ID,
wherein the unique key is received via at least one of an F1AP message or an RRC message, and
wherein the BAP control PDU message is verified at one of a BAP layer or an F1AP layer.

13. A method performed by a parent integrated access backhaul (IAB) node in a wireless communication system, the method comprising:
generating a unique key by inputting a unique identifier (ID) of the parent IAB node and a key distribution function (KDF);
transmitting, to a child IAB node, the unique key, the unique key is used for verifying an authenticity of a backhaul adaptation protocol (BAP) control protocol data unit (PDU) message;
transmitting, to the child IAB node, a first message indicating a backhaul-radio link failure (BH-RLF) between the child IAB node and the parent IAB node; and
receiving, from the child IAB node, a second message for the BH-RLF.

14. The method of claim 13, wherein the second message includes at least one of a RESET message, an F1 SETUP request message, an ERROR indication message, an RLF query request message, a radio resource control (RRC) connection re-establishment request message, an ECHO request message, an Internet control message protocol (ICMP) echo request message, or an RRC BH-RLF query request message.

15. The method of claim 13, wherein the second message is received over at least one of an F1 application protocol (F1AP) layer, a BAP layer, or an Internet protocol (IP) layer.

* * * * *